Patented Jan. 31, 1939

2,145,364

UNITED STATES PATENT OFFICE 2,145,364

TREATMENT OF ORGANIC COMPOUNDS

Robert Wighton Moncrieff and Charles William North, Spondon, near Derby, England, assignors to Celanese Corporation of America, a corporation of Delaware No Drawing. Application September 29, 1936, Serial No. 103,204. In Great Britain October 5, 1935

15 Claims. (Cl. 8—115)

This invention relates to the saponification of filaments, threads, ribbons, fabrics and like materials having a basis of organic ester of cellulose, and in particular to a new method of locally saponifying such materials.

The principal object of the invention is to provide a convenient and rapid method whereby materials of the kind referred to above can be saponified locally to such an extent that the saponified portions have an affinity for cotton dyes but substantially no affinity for cellulose ester dyes, while other portions of the materials remain unsaponified and with an affinity for cellulose ester dyes and none for cotton dyes. Materials saponified in this way, particularly threads, are of great value in the production of effect materials.

According to the present invention, selected portions of the materials to be treated are reserved against saponification by coating them with a water-resistant composition which is incompatible with the cellulose ester and capable of reacting with the saponifying agent to form water-soluble compounds. When the so treated materials are then treated all over with an alkaline saponifying agent the uncoated portions are saponified to an extent which may be substantially complete, while the reserve composition is attacked by the saponifying agent to an extent which renders it readily removable by subsequent washing without, however, allowing penetration of the saponifying agent to the reserved parts of the material. The reserve may, for example, be a higher fatty acid such as stearic acid. By this process threads having portions substantially completely saponified alternating with substantially unsaponified threads can be rapidly produced by a continuous process.

Any suitable saponifying agent may be employed in the process of the invention. Among the most useful are alkaline metal hydroxides, e. g. caustic soda, which saponify cellulose ester materials very rapidly, so enabling the process of the invention to be carried out continuously at a high rate. Weaker saponifying agents such as sodium carbonate and tri-sodium phosphate, sodium silicate, and organic bases such for example as methylamine, ethylamine, ethylene diamine and mono-ethanolamine are less suitable.

The saponifying agent is preferably applied in an aqueous bath. While the use of relatively low concentrations of saponifying agent, e. g. 5% or even less of sodium hydroxide is not excluded, higher concentrations are preferable with a view to rapid saponification, e. g. 10-15 or 20% or more of caustic soda. The temperature may be relatively low, for example 20 to 30° C. or even lower, or may be considerably higher, for example 50 to 60° up to 80 to 90° or between 90 and 100° C. High temperatures are, in general, advantageous from the point of view of obtaining rapid saponification. Many of the reserves suitable for the process of the invention are, however, of relatively low melting point and this should be taken into consideration in determining the temperature at which to work.

The saponifying bath may contain substances capable of reducing the alkalinity of the bath and/or the solubility therein of the products formed by reaction between the saponifying agent and the reserve. Thus when the saponifying agent is caustic soda it is of advantage to have present sodium salts such, for example as sodium acetate, sodium lactate, sodium tartrate or sodium chloride. These salts may be present in a small quantity, for example up to 5% or in a substantial amount, for example 10 to 15 or 20 or more according to the nature of the saponifying medium and of the reserve, and also the temperature and speed of working.

As indicated above the reserve should be a substance which is initially impermeable to the saponifying medium but which is acted on by that medium during the saponification to such an extent as to be readily removable by a subsequent washing process, without becoming sufficiently permeable during the saponification to allow the reserved portions of the material to be attacked. Solid fatty acids of high molecular weight have been found very suitable for this purpose. Examples of such acids are stearic, palmitic, lauric and elaidic acid. When working at relatively low temperatures oleic acid may also be used. Other organic acids of high molecular weight may also be employed, for example abietic acid and other resin acids. Instead of the acids themselves, derivatives which are impermeable to the saponifying medium and capable of reaction with that medium, to form salts of the corresponding acid with the saponifying agent may be used, for example the amides of acids of high molecular weight such as the acids referred to above. Paraffin wax and other wax-like substances which are unaffected by the saponifying agent, e. g. the wax-like products obtainable by chlorinating naphthalene or diphenyl, may be present in admixture with the acid. Thus, e. g. the composition may comprise 80 to 85, 90 or 95% of solid fatty acid and 5 to 10, 15 or 20% of paraffin wax or the like.

The process may be carried out so that by the time the desired saponification of the ester is effected the reserve has only been attacked to a slight extent. For example a film of the salt of the reserve with the saponifying agent may have been formed on the surface of the reserve only. Even attack to so slight an extent has been found to facilitate the removal of the reserve by a subsequent washing. On the other hand the reserve may have been converted to a considerable extent into a salt, but this may be prevented from dissolving in the saponifying medium owing to the presence therein of a substance or substances having an ion in common with the salt. Thus, for example, when stearic acid is used as a reserve in saponification by caustic soda, the concentration of the caustic soda may itself be sufficiently high to prevent solution of the sodium stearate formed; or this effect may be in part due to the presence in the saponifying medium of a sodium salt, for example sodium acetate in addition to the caustic soda. The readiness with which the reserve and/or its decomposition products can be removed is an important advantage of the process.

Any suitable method may be adopted for applying the reserve to the materials. When the materials are in the form of threads, for example, these may be run continuously past a bath containing the reserve in solution in a suitable solvent, or in the molten state, and may be periodically depressed into said bath by suitable means, for example by the action of a paddle or the like which presses upon the yarn or by thread guides actuated by cams. Or apparatus of the kind illustrated in Patent No. 1,992,259 may be used to apply a reserve in solution. When the reserve is applied in solution the solvent should be removed, for example by evaporation, before the materials enter the saponifying bath. Naturally the solvent used should not exert a deleterious effect on the cellulose ester.

After passage through the saponifying bath at a speed preferably determined so as to produce the desired saponification by the time the materials leave the bath, they may then pass to a washing bath or baths wherein excess of saponifying agent is removed together with the reserve, and from thence to drying and collecting means. Preferably the whole process is carried out continuously, the threads being drawn in warp formation, that is in parallel alignment in the same plane, from a creel past means for applying the reserve at intervals along the length of the threads, then, if necessary, through a bath or other means for removing solvent applied with the reserve and then in turn through the saponifying bath and washing bath to the collecting means.

Colouration of the threads may, if desired, be effected in the saponifying bath, this bath may, for example, contain a cotton dye and/or a cellulose ester dye; or the materials may be dyed continuously with, but as a separate operation from, saponification. One of the advantages of the invention, however, is that it enables uncoloured threads to be made which when woven into fabrics can readily be treated so as to give cross-dye effects, the actual colours of which need not be determined until the last stage of manufacture. Materials produced according to the invention enable colour effects to be produced which were previously unobtainable or only obtainable with considerable difficulty. It was, for example, previously difficult to obtain materials which could be cross-dyed to give contrasting red and blue effects. Materials showing these effects can, however, readily be obtained by treating materials locally saponified according to the invention with say a red cotton dye and a blue dye of the type SRA.

Although the invention has been described above with particular reference to the treatment of threads of cellulose acetate it is also applicable to the treatment of other materials, for example fabrics, ribbons and the like having a basis of organic ester of cellulose. Fabrics and ribbons may, for example, be treated by similar methods to those described in connection with threads above. Thus these materials may be treated first with the reserve which may by suitable means be applied in molten form or solution, and may then be passed through saponifying baths, washing baths to suitable drying and collecting means. The whole process may be carried out as a continuous operation or, if desired, as a batch process.

Among other organic esters of cellulose which may form the basis of the materials treated mention may be made of cellulose formate, propionate, butyrate, acetate propionate, acetate nitrate, ethyl, methyl and benzyl cellulose, ethyl-cellulose acetate and oxy-ethyl-cellulose acetate.

The following examples illustrate the invention:—

Example 1

Cellulose acetate yarn is coated at intervals along its length with a composition consisting of stearic acid by drawing the thread past a rotating paddle partly immersed in the molten composition. The coated thread is given a short air-run to solidify the coating and is then passed continuously through an aqueous bath containing 10 to 15% of caustic soda at a temperature of 75 to 95° C. The speed of travel of the material is adjusted so that the desired saponification in the uncoated portions of the yarn is effected by the time the material leaves the bath without substantial saponification of the reserved portions of the yarn. The yarn is led from the saponifying bath through a washing bath wherein the coating composition is removed.

Example 2

The process is carried out as described in Example 1, except that the saponifying bath comprises an aqueous solution containing 12 to 18% of caustic soda and 5 to 15% of sodium acetate, and the coating composition comprises a mixture of 5 to 15% paraffin wax with 95 to 85% stearic acid.

In a similar way other coating compositions may be applied, for example palmitic, oleic or elaidic acid alone or in admixture with waxy substances not affected by the saponifying agent, for example paraffin wax or chlorinated naphthalene.

Having described our invention what we desire to secure by Letters Patent is:—

1. Process for locally saponifying threads, ribbons, films, fabrics and like materials having a basis of organic ester of cellulose, which comprises subjecting said materials to the action of an alkaline saponifying medium while they are locally reserved against alkaline saponification by means of a reserve composition containing a water-insoluble substance selected from the group consisting of solid organic acids of high molecular weight and their amides, which reacts with the saponifying agent during the saponifying treatment to form a water-soluble substance and removing the materials from the action of the saponifying medium before substantial saponification of the reserved portions has occurred.

2. Process for locally saponifying threads, ribbons, films, fabrics and like materials having a basis of cellulose acetate, which comprises subjecting said materials to the action of an alkaline saponifying medium while they are locally reserved against alkaline saponification by means of a reserve composition containing a water-insoluble substance selected from the group consisting of solid organic acids of high molecular weight and their amides, which reacts with the saponifying agent during the saponifying treatment to form a water-soluble substance and removing the materials from the action of the saponifying medium before substantial saponification of the reserved portions has occurred.

3. Process for locally saponifying threads, ribbons, films, fabrics and like materials having a basis of cellulose acetate, which comprises subjecting said materials to the action of an alkaline saponifying medium while they are locally reserved against alkaline saponification by means of a reserve composition containing a preponderating proportion of a water-insoluble fatty acid which is solid at ordinary temperatures and which reacts with the saponifying agent during the saponifying treatment to produce a water-soluble substance and removing the materials from the action of the saponifying medium before substantial saponification of the reserved portions has occurred.

4. Process for locally saponifying threads, ribbons, films, fabrics and like materials having a basis of cellulose acetate, which comprises subjecting said materials to the action of an alkaline saponifying medium while they are locally reserved against alkaline saponification by means of a reserve composition containing a wax-like substance which is unaffected by the saponifying agent and a preponderating proportion of a water-insoluble fatty acid which is solid at ordinary temperatures and which reacts with the saponifying agent during the saponifying treatment to produce a water-soluble substance and removing the materials from the action of the saponifying medium before substantial saponification of the reserved portions has occurred.

5. Process for locally saponifying threads, ribbons, films, fabrics and like materials having a basis of cellulose acetate, which comprises subjecting said materials to the action of an alkaline saponifying medium capable of forming a soluble salt with stearic acid while they are locally reserved against alkaline saponification by means of a reserve composition containing a wax-like substance which is unaffected by the saponifying agent and a preponderating proportion of stearic acid and removing the materials from the action of the saponifying medium before substantial saponification of the reserved portions has occurred.

6. Process for locally saponifying threads, ribbons, films, fabrics and like materials having a basis of cellulose acetate, which comprises subjecting said materials to the saponifying action of an aqueous alkali-metal hydroxide bath while they are locally reserved against said saponifying action by means of a reserve composition containing a water-insoluble substance selected from the group consisting of solid organic acids of high molecular weight and their amides, which reacts with the alkali-metal hydroxide during the saponifying treatment to form a water-soluble substance.

7. Process for locally saponifying threads, ribbons, films, fabrics and like materials having a basis of cellulose acetate, which comprises subjecting said materials to the saponifying action of an aqueous alkali-metal hydroxide bath while they are locally reserved against such saponifying action by means of a reserve composition containing paraffin wax and a preponderating proportion of stearic acid and removing the materials from the action of the saponifying medium before substantial saponification of the reserved portions has occurred.

8. Process for locally saponifying yarns, ribbons or like materials having a basis of organic ester of cellulose, comprising applying a molten composition containing a preponderating proportion of a fatty acid which is solid at ordinary temperatures to the materials at intervals along their length by drawing them past a rotating paddle-wheel or like device dipping into a bath of the molten composition, effecting solidification of the coating in the course of an air-run, passing the coated materials through an aqueous alkaline saponifying bath at such a rate as to saponify the uncoated portions and partly convert the reserve composition into water-soluble compounds without substantially saponifying the reserved portions of the material, and passing the material through a washing bath to remove the composition.

9. Process for locally saponifying yarns, ribbons or like materials having a basis of cellulose acetate, which comprises applying a molten composition containing a preponderating proportion of a fatty acid which is solid at ordinary temperatures to the materials at intervals along their length by drawing them past a rotating paddle-wheel or like device dipping into a bath of the molten composition, effecting solidification of the coating in the course of an air-run, passing the coated materials through an aqueous alkaline saponifying bath at such a rate as to saponify the uncoated portions and partly convert the reserve composition into water-soluble compounds without substantially saponifying the reserved portions of the material, and passing the material through a washing bath to remove the composition.

10. Process for locally saponifying yarns, ribbons or like materials having a basis of cellulose acetate, comprising applying a molten composition containing a preponderating proportion of stearic acid to the materials at intervals along their length by drawing them past a rotating paddle-wheel or like device dipping into a bath of the molten composition, effecting solidification of the coating in the course of an air-run, passing the coated materials through an aqueous alkaline saponifying bath at such a rate as to saponify the uncoated portions and partly convert the reserve composition into water-soluble compounds without substantially saponifying the reserved portions of the material, and passing the material through a washing bath to remove the composition.

11. Process for locally saponifying yarns, ribbons or like materials having a basis of cellulose acetate, comprising applying a molten composition containing 5 to 15% of paraffin wax and 95 to 85% of stearic acid to the materials at intervals along their length by drawing them past a rotating paddle-wheel or like device dipping into a bath of the molten composition, effecting solidification of the coating in the course of an air-run, passing the coated materials through an aqueous alkaline saponifying bath at such a rate as to saponify the uncoated portions and partly convert the reserve composition into water-soluble compounds without substantially saponifying the reserved portions of the material, and passing the material through a washing bath to remove the coating composition.

12. Threads, ribbons, films, fabrics and like materials having a basis of organic ester of cellulose, locally reserved against alkaline saponification by means of a reserve composition containing a preponderating proportion of a water-insoluble fatty acid which is solid at ordinary temperatures.

13. Threads, ribbons, films, fabrics and like materials having a basis of cellulose acetate, locally reserved against alkaline saponification by means of a reserve composition containing a preponderating proportion of a water-insoluble fatty acid which is solid at ordinary temperatures.

14. Threads, ribbons, films, fabrics and like materials having a basis of cellulose acetate, locally reserved against alkaline saponification by means of a reserve composition containing a preponderating proportion of stearic acid.

15. Threads, ribbons, films, fabrics and like materials having a basis of cellulose acetate, locally reserved against alkaline saponification by means of a reserve composition containing paraffin wax and a preponderating proportion of stearic acid.

ROBERT WIGHTON MONCRIEFF.
CHARLES WILLIAM NORTH.